US007204951B2

(12) United States Patent
Simpson et al.

(10) Patent No.: US 7,204,951 B2
(45) Date of Patent: Apr. 17, 2007

(54) METHOD OF ASSEMBLING A SINGLE PIECE CO-CURED STRUCTURE

(75) Inventors: Craig B. Simpson, Mapleton, UT (US); Mike G. Allman, Spanish Fork, UT (US); Steven T. Tuttle, Springville, UT (US); Larry J. Ashton, Mapleton, UT (US)

(73) Assignee: Rocky Mountain Composites, Inc., Spanish Fork, UT (US)

( * ) Notice: Subject to any disclaimer, the term of this patent is extended or adjusted under 35 U.S.C. 154(b) by 598 days.

(21) Appl. No.: 10/208,241

(22) Filed: Jul. 30, 2002

(65) Prior Publication Data

US 2004/0070108 A1 Apr. 15, 2004

(51) Int. Cl.
*B29C 44/16* (2006.01)
(52) U.S. Cl. ................. 264/523; 264/573; 264/257; 264/263; 264/313; 264/314; 264/904; 425/387.1; 425/390
(58) Field of Classification Search ............... 264/313, 264/314, 904
See application file for complete search history.

(56) References Cited

U.S. PATENT DOCUMENTS

| | | |
|---|---|---|
| 1,814,556 A | 7/1931 | Jewett, Jr. |
| 3,764,641 A | 10/1973 | Ash |
| 4,126,659 A | 11/1978 | Blad |
| 4,198,018 A | 4/1980 | Brault .................. 244/119 |
| 4,357,193 A | 11/1982 | McGann et al. ............ 156/286 |
| 4,445,951 A | 5/1984 | Lind et al. .................. 156/93 |
| 4,622,091 A | 11/1986 | Letterman .................. 156/286 |
| 4,624,874 A | 11/1986 | Schutze |
| 4,681,724 A | 7/1987 | Faiz et al. .................. 264/257 |
| 4,808,362 A | 2/1989 | Freeman .................... 264/257 |
| 4,938,824 A | 7/1990 | Youngkeit .................. 156/173 |
| 5,106,568 A | 4/1992 | Honka ........................ 264/510 |
| 5,170,967 A | 12/1992 | Hamamoto et al. |
| 5,242,523 A | 9/1993 | Willden et al. ............. 156/285 |
| 5,266,249 A | 11/1993 | Grimes, III et al. ........ 264/45.2 |
| 5,332,178 A | 7/1994 | Williams |

(Continued)

FOREIGN PATENT DOCUMENTS

| | | |
|---|---|---|
| DE | 37 07 634 C1 | 7/1988 |
| EP | 0 408 161 | 1/1991 |
| EP | 1 134 069 A1 | 9/2001 |
| FR | 1 085 142 | 1/1955 |
| WO | WO-98/32589 | 7/1998 |
| WO | WO 99/32273 | 1/1999 |
| WO | WO-99/04952 | 2/1999 |

OTHER PUBLICATIONS

Japanese Patent Abstract No. 07088845; Publication Date Apr. 4, 1995, p. 1, Applicant Toyota Motor Corp.

*Primary Examiner*—Edmund H. Lee
(74) *Attorney, Agent, or Firm*—Craig Metcalf; Snell & Wilmer L.L.P.

(57) ABSTRACT

A method for manufacturing a composite structure is disclosed herein. The process uses a frame and selectively pressurizable forms. The forms define the interior members of the composite structure and frames define the exterior surface of the composite structure. Composite material is wrapped around the forms and the forms and composite material are placed in the frame. Selective forms are then pressurized and the composite material is co-cured together. A single piece co-cured fuselage incorporating a plurality of stiffeners is also disclosed in the application. The stiffeners are co-cured to the fuselage and may be in various patterns. The patterns may include an iso-grid pattern, and ortho-grid pattern, and a hoop-grid pattern.

72 Claims, 7 Drawing Sheets

U.S. PATENT DOCUMENTS

| | | |
|---|---|---|
| 5,435,504 A | 7/1995 | Inoue et al. .................. 244/13 |
| 5,496,002 A | 3/1996 | Schütze ...................... 244/123 |
| 5,534,203 A | 7/1996 | Nelson et al. |
| 5,641,366 A | 6/1997 | Hohman .................... 156/62.8 |
| 5,683,646 A | 11/1997 | Reiling, Jr. |
| 5,721,034 A | 2/1998 | Seemann, III et al. ........ 428/71 |
| 5,875,732 A | 3/1999 | Chapman et al. ........... 114/357 |
| 5,985,197 A * | 11/1999 | Nelson et al. .............. 264/221 |
| 6,179,945 B1 | 1/2001 | Greenwood et al. ........ 156/171 |
| 6,190,484 B1 | 2/2001 | Appa |
| 6,234,423 B1 | 5/2001 | Hirahara et al. |
| 6,237,873 B1 | 5/2001 | Amaoka et al. |
| 6,458,309 B1 | 10/2002 | Allen et al. |
| 6,510,961 B1 | 1/2003 | Head et al. |
| 6,513,757 B1 | 2/2003 | Amaoka et al. |

* cited by examiner

METHOD OF ASSEMBLING A SINGLE PIECE CO-CURED STRUCTURE

BACKGROUND OF THE INVENTION

1. Field of the Invention

The present invention relates to forming advanced composite materials. More particularly, the present invention relates to a process for creating a single piece co-cured composite structure.

2. Technical Background

Advanced composite materials have presented a promising alternative to metals, plastics, and fiberglass. Advanced composite materials have the advantage of being very lightweight and have a high strength. Particularly, carbon-epoxy composite material are among the most promising of the advanced composite materials. Composite materials may also be formed into any number of different shapes, depending upon the application. Because of these advantages, composite materials are being employed in many different fields, such as aeronautics.

However, composite materials also have some disadvantages. Composite materials can be several times more expensive than metals or fiberglass. Despite the desirable strength and weight characteristics of composite materials, the price of the composite materials can often be cost prohibitive.

Additionally, forming composite materials into a desired structure can require complex assembly equipment and multiple manufacturing procedures. For example, composite materials often require expensive frames and mandrels in order to form a simple shape. Often, these frames must be airtight to allow a vacuum to be placed on the frame in order to bias the composite material against the interior of the frame. Additionally, these frames can require a complex resin injection system to impregnate the composite material with a resin.

Furthermore, once the composite materials are cured the attachment of multiple cured composite structures can be problematic. Currently, most complex composite structures are manufactured by assembling multiple cured composite sections. The sections are typically attached together through traditional fasteners, such as screws and bolts. This requires various fastener holes to be made into the composite materials. Each hole in the composite material severs fibers in the composite material, thus weakening the material. Other current methods of assembling cured composite structures are through post-curing adhesive bonding. However, both adhesive bonding and attaching traditional fasteners require time consuming assembly steps which are ultimately very expensive.

The expensive and complex steps for assembling a composite structure limit the widespread use of composite materials. For example, one field where the disadvantages in composite materials restrict the widespread use is in the aeronautics field. In aeronautics it is desirable for the fuselage of an aircraft to be high strength and lightweight. A lightweight fuselage increases the fuel efficiency and reduces the operating costs of an aircraft. The high strength of composite materials reduces the potential for damage to the fuselage caused by the compression and decompression of the fuselage during multiple flights.

However, the advantages provided by composite materials in fuselage construction are often not beneficial enough to overcome the disadvantages. For example, the high manufacturing costs of the fuselage can prevent the initial purchase of the aircraft, despite their lower fuel costs over a lifetime of operation. Additionally, the multiple fasteners required to assemble the various sections of cured composite structures can reduce the strength provided by the composite material. Another disadvantage is the inspection required for individual fasteners and bonding joints in aeronautic applications. Such inspections can be time-consuming and add further cost in manufacturing the fuselage.

Therefore, there is a need in the art for an inexpensive composite material manufacturing process. There is also a need in the art for an assembly process capable of co-curing the various sections of composite materials. There is a further need in the art for an assembly process capable of manufacturing complex composite structures. A need also exists for an assembly process that requires minimal fasteners and fastener holes. There is an additional need for a process that eliminated post-curing bonding steps.

There is a further need in the art for a fuselage that limits the number of fasteners present in the fuselage. There is also a need for a fuselage that may be assembled with limited assembly procedures. There is a need for a fuselage that is lightweight. A need also exists for a fuselage that limits the extent of inspection required in post manufacturing and during maintenance. A need further exists for a low-cost composite fuselage. Such a fuselage and method for manufacturing a composite structure are disclosed and claimed herein.

BRIEF SUMMARY OF THE INVENTION

The apparatus and method of the present invention have been developed in response to the present state-of-the-art, and, in particular, in response to problems and needs in the art that have not yet been fully resolved by currently available composite material technology. Thus, it is an overall objective of the present invention to provide an inexpensive process for manufacturing composite structures and to provide a low cost composite fuselage.

The method for manufacturing a composite structure comprises providing a plurality of forms and a frame. A form has a foam core surrounded by a membrane, where selective forms are pressurizable. The frame is a generally rigid structure with at least one shaping surface. The forms and the frames cooperate to define a composite structure, where the composite structure is maintained in a desired shape while being cured.

Sections of composite material may be positioned between selective forms and at least one sheet of composite material is placed around the forms to create an exterior of a composite structure. The composite material and the forms are then enclosed in the frame. Selective forms may then be pressurized to bias the composite material against adjacent forms and against the shaping surface.

The forms may be comprised of a foam core and a membrane. The foam core is inserted into the membrane and the membrane is sealed to allow the pressurization of the form. The foam core is configured to be structurally stable at a first temperature and shrink at a second temperature. A gas source may be fluidly coupled to the form in order to pressurize the form. In one embodiment, the form is pressurized by a pipe located in the foam core and extending through the membrane. Alternatively, a gas generant may be located within the form.

The composite material may be adhered to the shaping surface by first placing a composite material on the shaping surface. A vacuum layer and several intermediate layers may be placed on the composite material and the air underneath a vacuum layer evacuated. The evacuation of air will cause the atmospheric pressure to place a force on the composite material in order to adhere the composite material to the shaping surface.

The composite material may be pre-impregnated with a resin, where the composite material is slightly tacky, to allow adhesion to the shaping surfaces and the forms. Furthermore, the composite material may be cured at a plurality of temperatures and the pressurizable forms may be inflated at a plurality of pressures.

The present invention also includes a single piece of co-cured fuselage. The fuselage comprises a structure having an interior and exterior, where a plurality of stiffeners are located on the interior of the fuselage. The stiffeners are co-cured to the fuselage. The stiffeners may be in various patterns, such as an iso-grid, ortho-grid, or hoop-grid patterns.

The single piece co-cured fuselage may be manufactured in a process similar to that described above. A foam mandrel covered by a membrane may be used to create a generally fuselage shaped pressurizable form. The form may then be covered by a plurality of caul sheets that define the interior surface of the fuselage. The caul sheets are generally rigid shaping members having various contours and channels. In one embodiment, the caul sheets have a plurality of channels to define stiffeners located on the interior of the fuselage. Then, composite material is placed in the channels and around the caul sheets. The composite material is next placed in a frame to define the exterior surface of the fuselage. The composite material is finally cured and the form and the caul sheets are removed.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more detailed description of the invention summarized above will be rendered by reference to the appended drawings. Understanding that these drawings only provide selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1–7, wherein like reference numbers indicate identical or functionally similar elements. The present invention, as generally described and illustrated in the Figures, may have a wide variety of configurations. Thus, the following more detailed description of the embodiments of the system and method of the present invention, as represented in the Figures, is not intended to limit the scope of the invention as claimed, but is merely representative of presently preferred embodiments of the invention.

Generally, one aspect of the present invention is a process for manufacturing a single piece co-cured composite structure. The composite structure is manufactured by creating the shape of the composite structure out of un-cured composite material, where different sections of composite material overlap adjacent sections of composite material. By overlapping multiple single-piece sections of composite material, individual sections of composite material are co-cured into a single piece composite structure.

The shape of the un-cured composite material may be defined by a plurality of forms capable of being created in different sizes and shapes. The un-cured composite material may be on and between the forms to define various internal members of a composite structure as well as portions of the exterior surface of the composite structure. The forms may be comprised of a foam core surrounded by a membrane. The foam core may be made into various shapes and may also be configured to be shrinkable after the composite material is cured, allowing the forms to be easily removed from the cured composite structure. Selective forms may also be pressurizable in order to bias the composite material against adjacent forms and against various shaping surfaces.

Once the composite material is positioned in the desired shape on and between selective forms, the composite material and the forms may be placed in a frame. The frame may have shaping surfaces to define the exterior surface of the composite structure. After the composite material and the forms are placed in the frame, some forms may be pressurized in order to bias the composite material against adjacent forms and against the shaping surfaces of the frame. The pressurizable forms cause the composite material to conform to the shape of the shaping surfaces and to the shape of the forms.

While the forms are pressurized, the composite material is cured at various temperatures. At a selective temperature, the foam core of the forms will substantially shrink allowing the form to be easily removed from the interior of a composite structure. After the curing process, the frame is opened and the remnants of the forms are removed. The cured composite material will maintain the shape defined by the forms and the shaping surfaces during the curing process.

Figure 1:
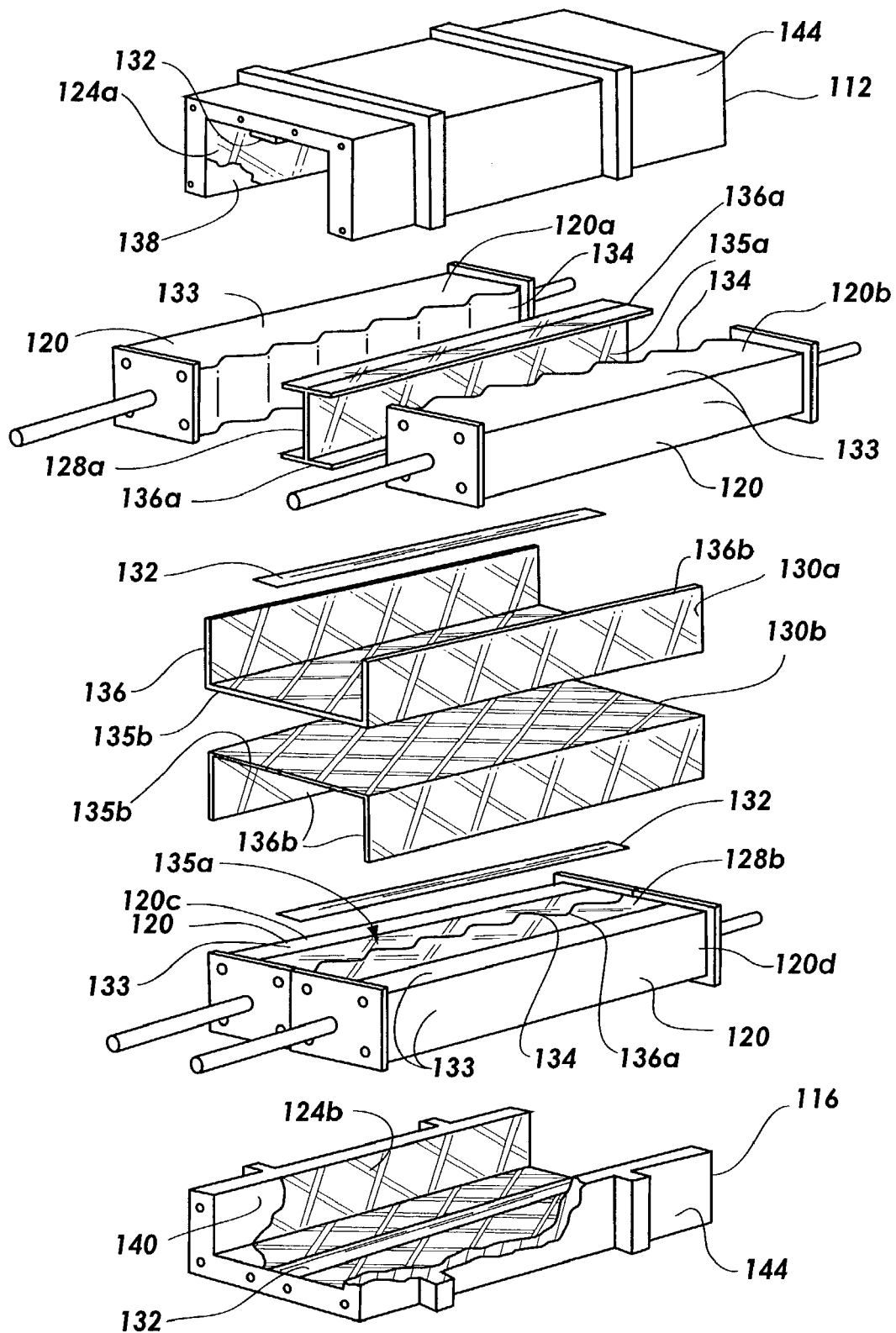
FIG. 1 is an exploded assembly view of a composite structure being assembled according to the disclosed process.

While the composite forming process has been broadly described above, a more detailed description of the individual steps and components may be better described by way of example in the assembling of a generic composite structure. Referring now to FIG. 1, an exploded assembly view of an embodiment of a method for creating a composite structure is illustrated. The method illustrated is simply an example of one generic composite structure that may be created by employing the present method and is provided for illustrative purposes only. It should be understood that multiple composite structures having various features may be created by the present method.

The method of manufacturing a composite structure may employ a plurality of frames 112, 116 and a plurality of forms 120a, 120b, 120c, 120d to manufacture various composite structures. The use of the frames 112, 116 and the forms 120 allows the composite material 124, 128, 130, 132 to be selectively positioned and cured into a desired shape.

The shape of a cured composite structure will be defined according to the shape and type of frames 112, 116 and the shape and type of forms 120a, 120b, 120c, 120d employed in the process. Because the frames 112, 116 and the forms 120a, 120b, 120c, 120d used in the process depend on the design of the composite structure, FIG. 1 merely illustrates the steps and techniques that may be employed in assembling one generic composite structure. However, by varying the shapes of the frames 116, 118 and the forms 120a, 120b, 120c, 120d, as well as varying the steps illustrated in FIG. 1, multiple other composite structures may be manufactured using this process.

An exploded assembly view of a generic composite structure is illustrated in FIG. 1. The exterior of the composite structure is an elongated rectangular box having open ends on either side of the box (assembled box not shown). The interior of the box is comprised of a vertical wall 128a, 128b and a horizontal wall 130a, 130b that divide the box into four generally equal sized chambers. The horizontal wall 130a, 130b is generally flat and the vertical wall 128a, 128b is generally corrugated with sinusoidal-shaped waves formed in the cured composite material.

The interior of the composite structure may be created with various sections or sheets of composite material 128a, 128b, 130a, 130b. The composite material 128a, 128b, 130a, 130b may be made into a C-shaped section by folding two ends of the sheet toward each other. However, the use of C-shaped sections will depend upon the individual composite structure. C-shaped sections of composite materials 128a, 128b, 130a, 130b have a generally broad wall section 135a, 135b and attachable flange sections 136a, 136b. The wall sections 135a, 135b of the C-shaped sections 128a, 128b, 130a, 130b allow a surface or other structure to be defined, such as a channel or support member.

The flange sections 136a, 136b of the C-shaped sections of the composite material 128a, 128b, 130a, 130b provide a location to attach the wall section 135a, 135b to other adjacent structures. For example, the composite material 128a, 128b that forms the corrugated vertical wall has a wall section 135a and flange sections 136a. The wall section 135a forms the corrugated wall and the flange sections 136a attach the corrugated wall to the composite material 124a, 124b of the exterior surface of the composite structure.

Similarly, the horizontal wall composite material 130a, 130b may also be a C-shaped section with a wall section 135b and flange sections 136b. The wall section 135b defines the horizontal wall and the flange sections 136b attaches the composite material 130a, 130b of the horizontal wall to the exterior composite material 124a, 124b. Thus, through a series of C-shaped sections of composite material 128a, 128b, 130a, 130b having wall sections 135a, 135b and flange sections 136a, 136b, multiple sheets of composite material 124, 128, 130, 132 may be attached and co-cured together.

Furthermore, two C-shaped sections of composite material, such as the sheets of composite material 128a, 128b, 130a, 130b illustrated in FIG. 1, may be positioned back to back to form an I-shaped section or I-beam. An I-beam may be desirable in various composite structures because of an I-beam's high strength in bending and torsion. The present method has the advantage of creating an I-beam support structure from two sheets of composite material 124, 128, 130, 132 with minimal assembly steps.

An I-beam may be created by positioning two C-shaped sections of composite material 128a, 128b, 130a, 130b back to back, as illustrated in FIG. 1. The C-shaped section 128a, 128b, 130a, 130b may be placed back to back before being wrapped onto a form 120a, 120b, 120c, 120d. Alternatively the C-shaped section 128a, 128b, 130a, 130b may be aligned back to back after being wrapped onto a form 120a-d by aligning corresponding forms 120a, 120b and 120c, 120d in a back to back configuration.

For example, the C-shaped section of composite material 128a, 128b, defining the corrugated vertical wall, may be placed on the wave shaped sides 134 of the form 120a, 120b, 120c, 120d, where the wall sections 135a substantially cover the wave shaped sides 134. The flange sections 136a, 136b may then be folded on to the top and bottom of the flat sides 133 on the forms 120a, 120b, 120c, 120d. Once the sections of composite material 128a, 128b, 130a, 130b are placed on the forms 120a, 120b, 120c, 120d, the two sets of forms 120a-d may be placed so that the C-shaped sections 128a, 128b are back to back, such as is illustrated by the two lower forms 120c, 120d in FIG. 1.

The C-shaped sections of composite material 130a, 130b defining the horizontal wall may be similarly attached together. Each of the sheets of composite material 130a, 130b may wrap around a set of forms 120a, 120b and 120c, 120d. By wrapping a sheet of composite material 130a, 130b around a set of forms 120a, 120b and 120c, 120d, the composite material 130a, 130b may be easily attached to the I-shaped composite material 128a, 128b.

Once the sheets of composite material 130a, 130b are wrapped around the forms 120a, 120b and 120c, 120d, the upper forms 120a, 120b may be placed on the lower forms 120c, 120d. By placing the upper forms 120a, 120b on the lower forms 120c, 120d, the C-shaped sections of composite material 130a, 130b, forming the horizontal wall of the generic composite structure, are placed back to back and form an I-beam.

Additionally, various composite material caps 132 may also be employed to strengthen the intersection of the two C-shaped sections of composite material 128a, 128b and 130a, 130b. For example, the composite material caps 132 illustrated in FIG. 1, are positioned on top of the intersection of the two C-shaped sections of composite material 128a, 128b and 130a, 130b. The composite material caps 132 strengthen the attachment of the C-shaped sections 128a, 128b and 130a, 130b and may fill gaps or dimples that may be present in the junction of composite sheets forming the I-shaped sections. Composite material caps 132 may be used in various other intersecting locations or alternatively, may be used in areas that require increased strength.

Once the forms 120a, 120b, 120c, 120d are positioned together, the forms 120a, 120b, 120c, 120d may be placed in the frames 112, 116. In one embodiment, the forms 120a, 120b, 120c, 120d are placed in the lower form 120, on top of the lower exterior composite material 124b. The upper exterior composite material 124a and the lower exterior composite material 124b are configured to form the exterior of the rectangular box of the generic composite structure. After the forms 120a, 120b, 120c, 120d and the composite material 128, 130, 132, forming the interior of the composite structure, are placed on the lower exterior composite material 124b, the upper frame is placed on the lower frame 116.

The upper frame 112 may have an upper exterior composite material 124a that covers the forms 120a, 120b, 120c, 120d and the composite material 128, 130, 132.

While, the forms 120a, 120b, 120c, 120d may be assembled first and then placed in the lower frame 112, the forms 120a, 120b, 120c, 120d and the composite material 128, 130, 132 may also be built-up directly on the lower frame 112. Placing individual forms on the lower frame 116 may be easier to assemble than moving a large multi-form member. Thus, the lower frame 116 may serve as an assembly table.

Furthermore, the exterior composite material 124a, 124b may have several variations, other than that illustrated in FIG. 1. For example, the exterior composite material 124a, 124b may be a large single piece of composite material. The single piece of composite material would be placed on the lower frame 112 and then wrapped around the forms 120a, 120b, 120c, 120d, once the forms 120a, 120b, 120c, 120d are placed on the lower frame 112.

Alternatively, the exterior composite material 124a, 124b may have sections that extend above the frames 112, 116. The sections of composite material that extend above the frames 112, 116 may overlap with the exterior composite material 124a, 124b positioned on the opposing frames 112, 116. Such sections of extending composite material may create an overlap to secure seams between different sections of composite material.

In yet another variation, the exterior composite material 124a, 124b may be comprised of multiple smaller sections of composite material. The multiple smaller sections of composite material may be laid together to form a generally large sheet of composite material. Similarly, the composite material 128, 130, 132 used in the internal members of the composite structure may also be comprised of multiple smaller sections of composite material.

Once the composite materials 124, 128, 130, 132 and the forms 120a, 120b, 120c, 120d are positioned within the frames 112, 116, selective forms 120a, 120b, 120c, 120d may be pressurized. The pressurization of selective forms 120a, 120b, 120c, 120d biases the composite materials 124, 128, 130, 132 against the adjacent forms 120a, 120b, 120c, 120d and against the shaping surfaces 138, 140 of the frames 112, 116. The biasing force is created by selective forms 120a, 120b, 120c, 120d pressurizing and expanding. The expanding forms 120a, 120b, 120c, 120d shape the composite materials 124, 128, 130, 132 by compressing the composite materials against the different forms 120a, 120b, 120c, 120d and against the frames 112, 116. The expanding forms 120a, 120b, 120c, 120d also force the composite materials 124, 128, 130, 132 against the shaping surfaces 138, 140, such that the composite material conforms to the shaping surfaces 138, 140.

In one embodiment, the pressurizable forms 120a, 120b, 120c, 120d are inflated to a pressure between about 30 psi and about 70 psi. However, the pressure in the forms 120a, 120b, 120c, 120d is a function of the type of forms 120a, 120b, 120c, 120d used and the type of composite materials 124, 128, 130, 132. Generally, higher pressures within the forms 120a, 120b, 120c, 120d will better force the composite materials 124, 128, 130, 132 together and eliminate air pockets within the composite material. Thus, it may also be desirable to pressurize forms 120a, 120b, 120c, 120d significantly above 70 psi. Furthermore, certain processes may only require minimal pressures within the forms 120a, 120b, 120c, 120d that are below 30 psi.

Additionally, it may be desirable to use a composite material 124, 128, 130, 132 that is pre-impregnated with a resin. A pre-impregnated composite material 124, 128, 130, 132 has the advantage of not requiring an additional resin impregnation process after the composite material 124, 128, 130, 132 is placed around forms 120a, 120b, 120c, 120d and into the frames 112, 116. A pre-impregnated composite material may also be tacky, allowing the composite material 124, 128, 130, 132 to be adhered to the forms 120 and frames 112, 116. Thus, once the composite material 124, 128, 130, 132 is wrapped around the forms 120a, 120b, 120c, 120d and placed in the frames 112, 116, it is ready to be cured.

A large number of resins are available for creating composite structures. One having ordinary skill in the art will recognize multiple epoxies and hardeners that may be employed. Phenolics and bisphenols are among some of the resin materials that may be used. Additionally, various curing times and temperatures may be used in the process. In some embodiments, curing times may range from one hour to ten hours. Other processes may have longer or shorter curing time. Curing temperatures may also vary. Phenolics and bisphenols may be cured at temperature ranges from 200° F. to 400° F. Again, any number of temperature ranges may be employed.

The composite material 124, 128, 130, 132 may be cured at various temperatures and for different times. The cure temperature and time of the composite material 124, 128, 130, 132 will depend upon the type of composite material and type of resin employed. However, composite materials 124, 128, 130, 132 are often cured at multiple different temperature settings for different periods of time. Once the composite material 124, 128, 130, 132 is cured, the frames 112, 116 maybe opened and the composite structure removed. The forms 120a, 120b, 120c, 120d or remnants of the forms 120a, 120b, 120c, 120d may then be removed, depending upon the type of forms 120a, 120b, 120c, 120d used.

Figure 2:
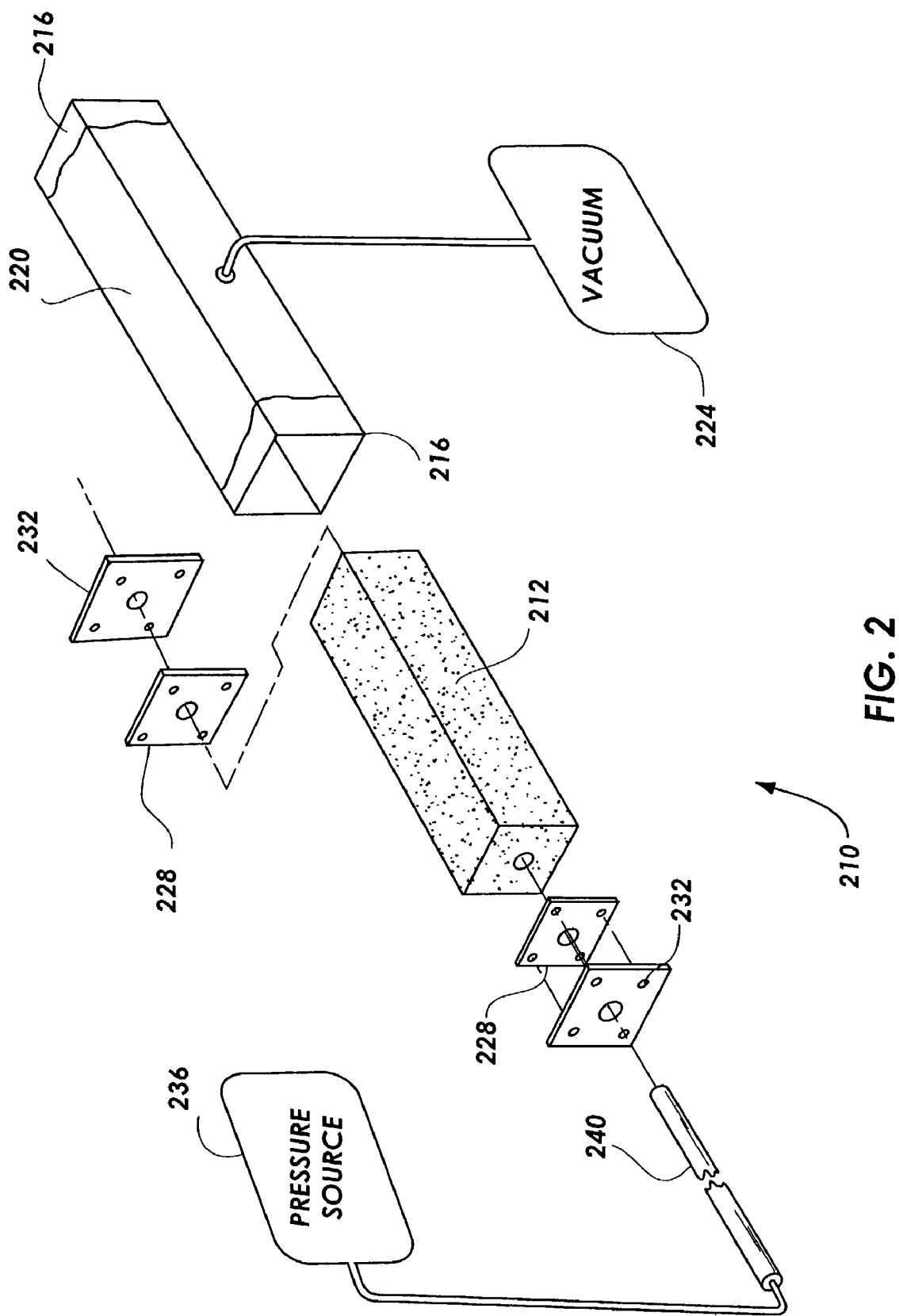
FIG. 2 is an exploded assembly view of a pressurizable form.

Various types of forms 120a, 120b, 120c, 120d may be used in the present process. Referring to FIG. 2, one type of form may include a pressurizable form 210 comprised of a foam core 212 surrounded by a membrane 216. The foam core 212 provides a generally rigid structure to control the shapes of composite material placed on the form 210. The foam core 212 may be easily molded or cut into the desired shapes and contours, such as a corrugated wall. Thus, the form 210 may be shaped to create any number of members within a composite structure.

The foam core 212 also provides the advantage of easy removal from a cured composite structure. For example, one type of foam core 212 may remain stable at a first temperature and shrink at a second temperature. Such a foam core 212 defines the shape of the composite material, while the material is being cured and then shrinks to allow the form 210 to be removed once the composite material is cured.

The foam core 212 may be covered by a membrane 216 which consists of any number of elastic materials, such as silicon, or other similar material. The membrane 216 may substantially cover the foam core 212 and allow for pressurization of the form 210. FIG. 2 illustrates an exploded assembly view of one type of form 210 having a pressurizable membrane 216.

The form 210 may be created by providing a foam core 212 having a selective shape and size. The foam core 212 illustrated in FIG. 2 is substantially elongated and rectangular. However the foam core 212 may be any number of shapes depending upon the individual application. For example, a corrugated composite wall structure would employ a foam core 212 having a corrugated foam surface on one side.

The membrane 216 is placed over the foam core 212 by first stretching open the membrane 216. In order to stretch open the membrane 216, the membrane 216 is placed into a rigid channel 220 and both ends of the membrane 216 are pulled around the ends of the rigid channel 220. A vacuum 224 is then pulled on the membrane 216 to evacuate the air between the interior of the channel 220 and the membrane 216. As the air is evacuated, the membrane 216 will open to allow insertion of the foam core 212. Once the foam core 212 is inserted into the membrane 216, the vacuum is released and the ends of the membrane 216 may be pulled off the ends of the rigid channel 220, allowing the membrane 216 to substantially surround the foam core 212.

The ends of the membrane 216 may be sealed in various ways. For example, the form 210, as illustrated in FIG. 2, may employ vacuum plates 228 and tie plates 232 to seal the membrane 216 around the foam core 212. The vacuum plates 228 may be positioned against the ends of the foam core 212, before the membrane 216 is placed over the foam core 212. When the membrane 216 is placed around the foam core 212, the vacuum plates 228 will be position between the membrane 216 and the ends of the foam core 212.

Tie plates 232 may then be attached to the vacuum plates 228, sandwiching the membrane 216 between the plates 228, 232. When the plates 228, 232 are tightened together, the ends of the membrane 216 are sealed. The seal around the membrane 216 allows the form 210 to be pressurizable and partially inflatable.

However, other methods of sealing the ends of the membrane 216 are also possible. For example, an elastic material similar to the membrane 216 may be placed over the ends of the foam core 212 in order to seal the membrane 216. Alternatively, the membrane 216 may only have one open end, similar to a bag, such that only one end must be sealed. Other systems for sealing the membrane 216 may also be possible and will be known to one ordinarily skilled in the art.

The membrane 216 provides several functions for the form 210. One function of the membrane 216 is to allow the form 210 to be pressurized. The membrane 216 receives an air or gas input from a pressure source 236 and may enter the membrane 216 through an inlet pipe 240 or other similar input mechanism. The inlet pipe 240 allows generally high pressure air to enter the foam core 212, where the air then permeates through the foam core 212 and pressurizes the membrane 216.

Additionally, the form 210 may incorporate varying methods of inflating the membrane 216. For example, a gas generant may be located in the foam core 212. As the foam core 212 is heated, the gas generant reacts and produces an inflation gas. Such a configuration allows the form 210 to be pressurized without the need for an inlet pipe 240 or other object protruding from the form 210.

The pressure within the membrane 216 may inflate the form 210, depending on the elastic characteristics of the membrane 216. The inflation of the membrane 216 allows the pressurizable form 210 to apply an outward biasing force on adjacent composite materials. The outward biasing force causes the composite material to conform to the shape defined by the forms, 120a, 120b, 120c, 120d, 210 and frames 112, 116.

The pressurizable form 210 also reduces the number of vacancies present between different layers of composite material. Typically, a composite structure is made of multiple layers of composite material. In a multi-layer composite structure, it is generally preferred that the number of vacancies or air pockets within the composite material be minimized. In order to accomplish this, the pressurizable form 210 places a force on the multiple layers of composite materials, forcing the layers together. As the layers of composite material are forced together, the air pockets are expelled and the vacancies are filled.

The pressure required to inflate or pressurized the forms will vary depending upon the membrane 216 material and the thickness of the composite material. Thicker composite materials and stiffer membranes 216 will require higher pressures in order to force the composite material into the desired shape and hold the materials in that shape while being cured.

However, the present method may incorporate non-pressurizable forms (not shown). The non-pressurizable forms may be created in a similar manner as the pressurizable forms. Non-pressurizable forms may include a foam core 212 surrounded by a membrane 216. However, the form would not receive a pressurizing gas input into the membrane.

A non-pressurizable form may be used in association with a pressurizable form 210 to shape an un-cured composite material. As discussed previously, a composite material is shaped by compressing composite material between the two pressurizable forms 210 into a desired shape. However, a similar shaping function may be accomplished by one pressurizable form 210 biasing against a non-pressurizable form to apply a compressive force on the composite material. The pressurizable form 210 could bias the composite material against the non-pressurizable form to shape the composite material. Thus, the number of forms 210 requiring a system for pressurizing the forms 210 may be reduced.

Another function of the membrane 216 is to provide a barrier between the composite material and the foam core 212. During curing, portions of the foam core 212 may become imbedded into the cured resin of the composite material, creating vacancies and undesired contamination. However, the use of a membrane 216 prevents the resin from coming into direct contact with the foam core 212. Thus, the foam core 212 may be completely removed from the composite structure without leaving residue of the foam core 212 imbedded in the composite material.

Another function of the membrane 216 is to protect the foam core 212 from being damaged during assembly. Foam is susceptible to having its edges damaged and to having unwanted shapes depressed into its surface by minimal contact with other objects. By covering the foam core 212 with a membrane 216, the integrity of the foam core's 212 shape may be maintained. To protect the foam core 212, the membrane 216 has a thickness sufficient to distribute small local forces over a broad area, thus limiting the potential of small local forces damaging the foam core 212.

The pressurizable forms also allow for a degree of tolerance in the size of the forms 210. Winding or weaving multiple layers of composite materials can create a composite material having areas of varying thicknesses and resulting in a generally low tolerance. Similarly, foam cores 212 and the surrounding membranes 216 will also have a low tolerance, particularly in complex shapes. To compensate for the low tolerance, the pressurizable form 210 expands to fill the vacant spaces between adjacent forms 210 and frames 112, 116.

The size and shape of the pressurizable form 210 will depend upon the type of composite structure and the internal members of the composite structure. For example, the pressurizable forms 120a, 120b, 120c, 120d, as illustrated in FIG. 1, each have a side with waves to shape the composite material 128a, 128b in cured corrugated walls. Generally, the forms 120a, 120b, 120c, 120d, 210 may have any number of polygonal or curvilinear shapes. Furthermore, the shape of the forms 120 may correspond to the shape of the frames 112, 116. By selecting forms 120a, 120b, 120c, 120d that have a shape corresponding to the shape of the frames 112, 116, a thin exterior surface may be created.

Additionally, other forms 210 not having a foam core 212 may be used in the manufacturing process. For example, the form 210 may be an inflatable bladder having no core. The bladder may be made of a generally thick and non-elastic material that stiffens during inflation. The bladder may be any number of shapes to provide a biasing force on the composite material against the form 210 or against various shaping surfaces 138, 140. Alternatively, the forms 210 may be a generally rigid structure that does not inflate, such as a metal channel.

Similar to the forms 120a, 120b, 120c, 120d, the present method may incorporate various frames 112, 116 to create different composite structures. For example, a frame 112, 116 may be employed that has a generally rigid structure having a shaping surface 138, 140. The frames 112, 116 of FIG. 1 have shaping surfaces 138, 140 that are comprised of three generally flat surfaces defining a rectangular shaped channel. The shaping surfaces 138, 140 are configured to define the exterior surface of the composite structure. The exterior surfaces of the composite structure are defined by the composite material 124 being biased against the shaping surfaces 138, 140, while the composite material is being cured.

The shaping surfaces 138, 140 may be any number of shapes according to the design of the composite structure. For example, the shaping surfaces 138, 140 may have various curved or rounded shapes to define the exterior surface of a similarly shaped composite structure. Alternatively, the shaping surfaces 138, 140 may include a combination of straight and rounded shapes. Various channels, protrusions, mounts, or any number of positive or negative shapes may be created by the shaping surfaces 138, 140.

Furthermore, the surface finishes of the shaping surfaces 138, 140 maybe selected such that the surface finishes are applied to the composite material 124 while being cured. The surface finishes of the shaping surfaces 138, 140 are applied to the composites material 124 as the composite material is biased against the shaping surfaces 138, 140. As the composite material 124 is biased against the shaping surfaces 138, 140 the fibers of the composite material 124 will substantially conform to the shaping surfaces 138, 140. Additionally, as the resin in the composite material 124 is forced against the shaping surfaces 138, 140, the resin flows against the shaping surface 138, 140 and the surface finish of the shaping surface is transferred to the cured composite material.

The ability to transfer the surface finish of the shaping surfaces 138, 140 to the cured composite material 124 allows various post curing processes to be eliminated. For example, when manufacturing a composite fuselage or wing it may be desirable for the surface finished to be substantially smooth, in order to reduce drag on the aircraft. By employing frames 112, 116 having substantially smooth shaping surfaces 138, 140, the application of multiple layers of paint or sealants may be eliminated. Alternatively, the shaping surface 138, 140 may have a substantially rough surface finish to create locations for adhesive attachment.

The shaping surfaces 138, 140 may also include various recesses (not shown) for positioning composite and non-composite objects to be cured to the composite material 124. The object may be positioned in the recess and the uncured composite material 124 may be placed on top of the object. When the composite material 124 is cured, the object will be co-cured to the composite structure.

The frames 112, 116 may also include a generally rigid structure to support the non-structural shaping surfaces 138, 140. Rigid structural support may be provided to prevent deflection and movement of the shaping surfaces 138, 140 during inflation of the pressurizable forms 210a–d. The supporting structures 144 of the frames 112, 116 may include multiple embodiments. For example, the supporting structure 144 may include various hollow beam members surrounding the shaping surfaces 138, 140 to prevent deflection, as illustrated in FIG. 1. Alternatively, the supporting structure 144 may be a substantially thick shaping surface 138, 140 that resists deflection. Generally, the structure of the frames 112, 116, may be any structure which supports the shaping surface 138, 140.

The frames 112, 116, may be made of any suitable rigid material, such as metal, composite material, plastics, or the like. However, the material is preferably lightweight to allow for easy transportation and movement. The frames 112, 116 may also be pivotally attached, such that the upper frame 112 may pivot on to the lower frame 116 to close the frames 112, 116.

The frames 112, 116 may also include end plates (not shown) to enclose the frames 112, 116. The end plates may also include a shaping surface to define the shape of a composite material while being cured. The end plates may simply be comprised of metal plates bolted or otherwise fastened to the sides of the frames 112, 116. The end plates may also include various openings to receive inlet pipes 240 or other similar inflation mechanisms.

Furthermore, any number of frames 112, 116 may be incorporated into the present system. Three or more frames 112, 116 may be used to define the surface of a composite structure. However, multiple frames 112, 116 can require complex attachment systems and can increase assembly time.

In yet another embodiment, the two frames 112, 116 may be coupled together to create a single enclosed frame 112, 116. The enclosed frame 112, 116 may have an opening to allow reception of the composite material 124, 128, 130, 132 and the forms 120a, 120b, 120c, 120d. The composite material 124, 128, 130, 132 is wrapped around the forms 120a, 120b, 120c, 120d and then inserted into the opening in the frame 112, 116. The forms 120a, 120b, 120c, 120d are then pressurized to bias the composite material 124, 128, 130, 132 against the shaping surface 138, 140 of the frame 112, 116 and the composite material 124, 128, 130, 132 is cured.

Figure 3:
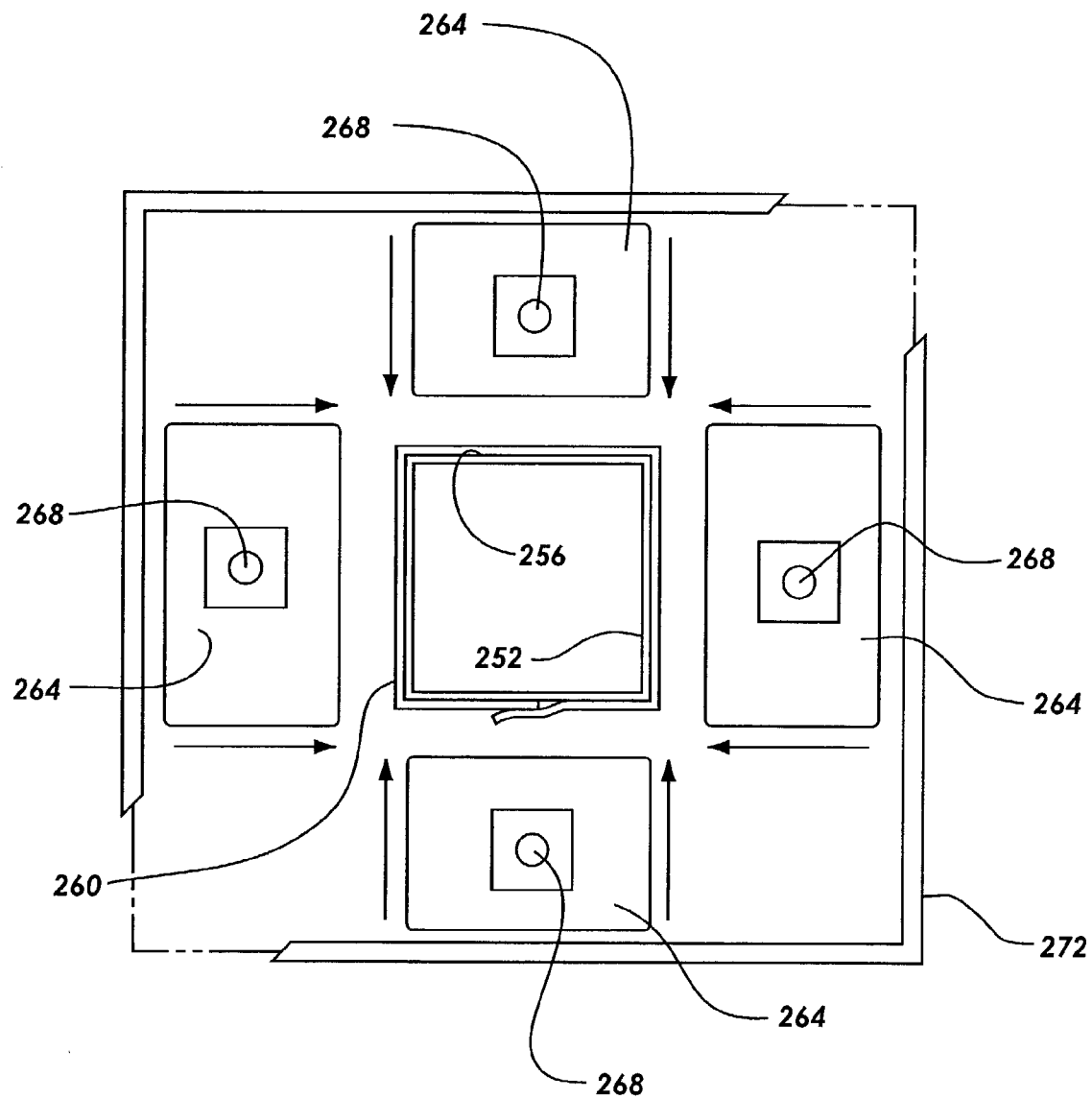
FIG. 3 is an exploded assembly view of an assembly process for defining an interior surface of a composite structure.

In a further variation, the method may include shaping surfaces on the exterior of the frame. Referring now to FIG. 3, a side view of an assembly process incorporating a frame 252 having an exterior shaping surface 256 is illustrated. The frame 252, shown in FIG. 3, is substantially square and has four exterior shaping surfaces 256. However, the frame 252 and the shaping surfaces 256 may be various shapes. The exterior shaping surface 256 allows the interior shape of a composite structure to be defined. A composite material 260 is wrapped around the shaping surface 256 and the frame 252, where the composite material 260 in contact with the shaping surface 256 defines the shape of the interior of the composite structure.

Pressurizable forms 264 are then placed around the composite material 260 and the frame 252 to apply a biasing force against the composite material 260 in order to form the composite structure. The forms 264 may be pressurizable through air-input openings 268 in the forms 264. As the forms 264 pressurize, the composite material 260 is biased against the shaping surface 256.

The assembly process may require an external frame 272 on which the forms 264 may react to apply a biasing force onto the composite material 260. The external frame 272 allows a reaction force on the external frame 272 to be transferred into a compressive force on to the composite material 260. In the absence of an external frame 272, the forms 264 may expand away from the composite material 260 without applying a biasing force on the composite material 260. Through such a method, an internal surface of a composite structure may be defined.

Figure 4:
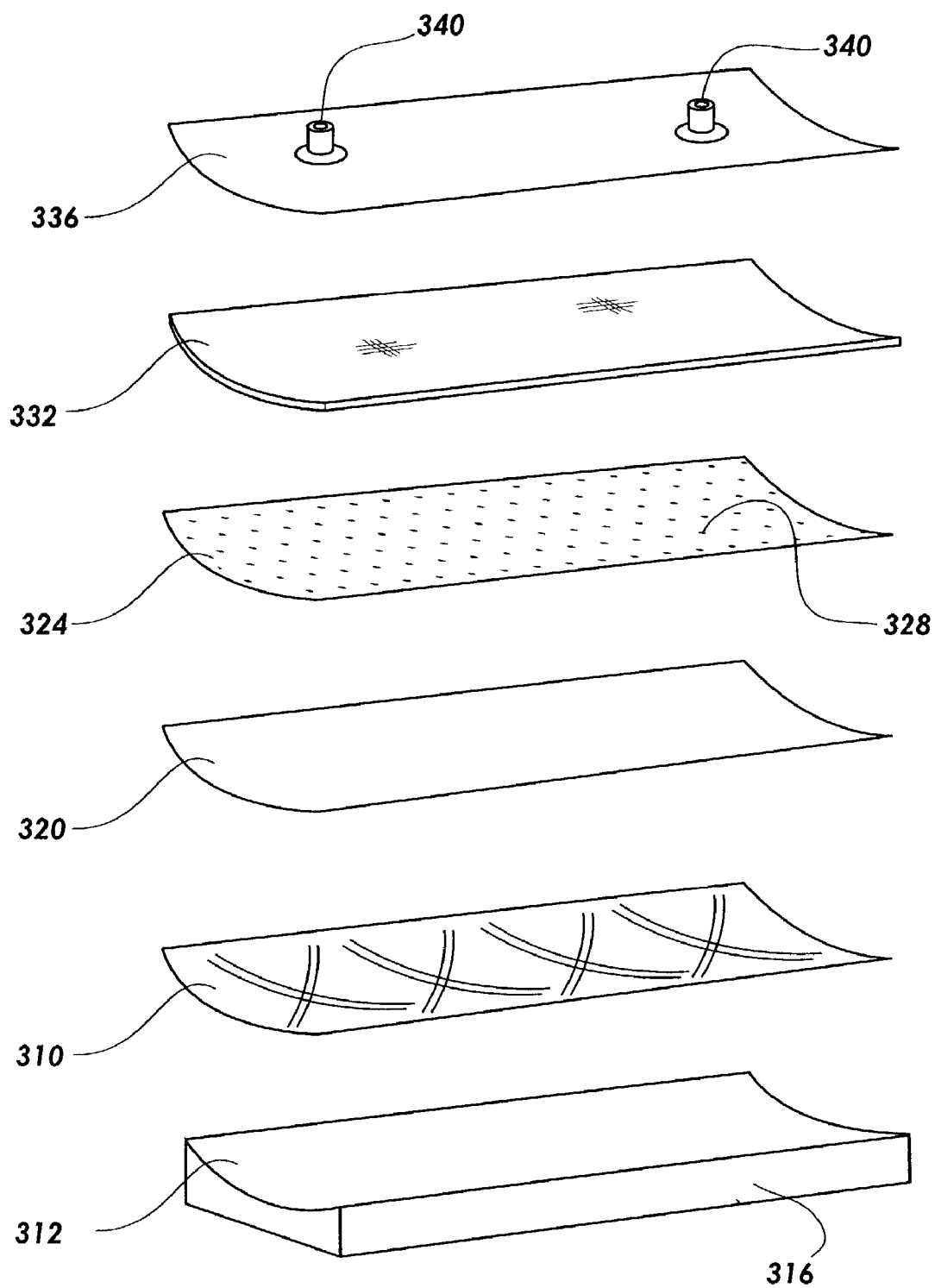
FIG. 4 is an exploded assembly view of a process for adhering a composite material to a shaping surface.

The present method may also include steps for uniformly adhering the composite material to the shaping surfaces 138, 140 and to the forms 120a, 120b, 120c, 120d. Referring now to FIG. 4, an exploded assembly view of the steps of uniformly adhering a composite material 310 to a shaping surface 312 is illustrated.

First, a composite material 310 is placed on the shaping surface 312 of a frame 316. The composite material 310 may be a generally large sheet of composite material 310 or may be made of multiple smaller sheets of composite material 310. Once the composite material 310 is placed on the shaping surface 312, a release layer 320 is placed on the composite material 310. The release layer 320 may be a thin plastic material that does not easily adhere to the composite material 310 in both the cured and un-cured state. The release layer 320 provides a barrier between the composite material 310 and other materials used.

Next, a breathable layer 324 is placed on the release member 320. The breathable layer 324 may be a plastic material having a plurality of holes 328 that allows air to pass through the breathable layer 324. Then, a force distribution layer 332 is placed on the breathable layer 324. The force distribution layer 332 may be a generally thick felt like material that allows a compressive force to be broadly distributed across the composite material 310. The force distributional layer 332 is also preferably breathable.

Finally, a vacuum layer 336 is placed on the force distribution layer 332. The vacuum layer 336 may have at least one vacuum port 340. The vacuum layer 336 substantially covers and seals the previously placed layers 310, 320, 324, 332. Once the vacuum layer 336 is sealed, the air underneath the vacuum layer 336 is evacuated through the vacuum ports 340. The air may escape from the composite material 310, around the release layer 320, and through both the breathable layer 324, and the force distribution layer 332.

As the air is evacuated, atmospheric pressure is applied on to the composite material 310. The force of the atmospheric pressure biasing the composite material against the shaping surface 312 of the frame 316 eliminates air pockets between the composite material 310 and the shaping surface 312 and improves adhesion. Once the composite material 310 is uniformly adhered to the shaping surface 312, the vacuum layer 336, the force distribution layer 332, the breathable layer 324, and the release layer 320 are removed.

A similar process may be used to apply composite material to a form 210. However, the process may use two separate release layers 320. First, the membrane 216 is wrapped in a first release layer 320. Then, a sheet of composite material 310 is wrapped around a form 210 and the release layer 320. A second release layer 320 is then wrapped around the composite material 310. Next, the breathable layer 324, the force distribution layer 332, and the vacuum layer 336 are wrapped around the form 210. The air within the vacuum layer 336 is evacuated to force the composite material 310 against the form 210. Finally, the vacuum layer 336, the force distribution layer 332, the breathable layer 324, and the second release layer 320 are removed form the form 210.

The method described above provides for an inexpensive and effective procedure for co-curing multiple sections of composite material together. Co-curing allows multiple independent composite sections to be attached without the need of fasteners and adhesives. Eliminating the need for fasteners and adhesives reduces the assembly time and reduces time consuming inspection of attachment locations.

One field that may benefit by co-curing large composite structures is the aeronautics and aerospace field. Aerospace and aeronautic applications rely on lightweight/high strength materials in many applications, making composite material a desirable option. Also, the ability to eliminate a majority of the fasteners required in previous aerospace and aeronautic application increases strength and decreases cost. Thus, single piece co-cure composite aerospace and aeronautic structures are desirable.

Figure 5:
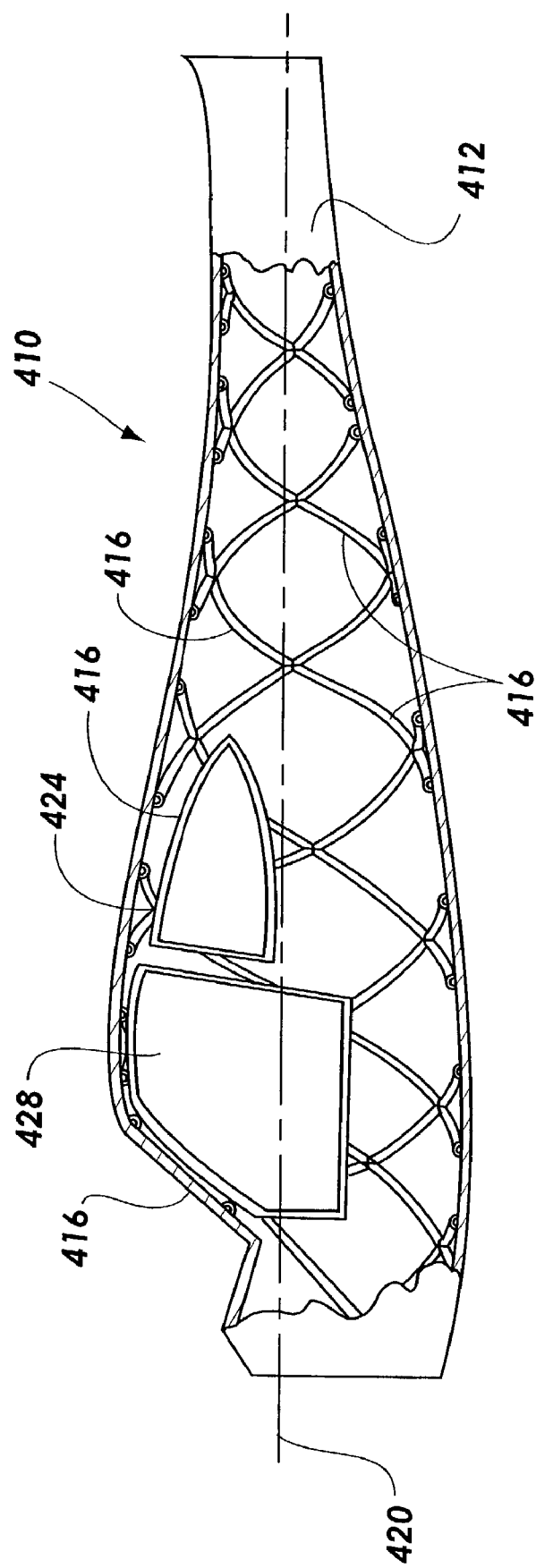
FIG. 5 is a cross-sectional view of a single piece co-cured fuselage.

Referring now to FIG. 5, a single piece co-cured fuselage 410 may be manufactured using the method described above. A single piece co-cured fuselage 410 has the advantage of incorporating the lightweight composite materials with minimal assembly time and with minimal fasteners.

The single piece co-cured fuselage 410 may have a fuselage shell 412 and a plurality of stiffeners 416. The fuselage shell 412 may be comprised of several layers of composite material. The thickness and number of layers of the composite material may vary throughout the fuselage 410. For example, areas requiring increased stiffness and strength, such as near the engine mount, may have more layers of composite materials than areas requiring less stiffness and strength.

The plurality of stiffeners 416 may be positioned along the interior of the fuselage shell 412. The stiffeners 416 may be a composite material that is co-cured to the interior of the fuselage shell 412. The stiffeners 416 may be a section of composite material that is raised above the interior surface of the fuselage shell 412. The cross-sectional shape of the stiffeners 416 may vary depending upon the application. For example, the stiffeners 416 may have a substantially arc-shaped cross-section. Other stiffeners 416 may have square or triangular shape cross-sections. Yet other stiffeners 416 may incorporate changing cross sections or various flat sections to allow mounting of various internal structures for the fuselage 410. Also, it may be desirable for the stiffeners 416 to have a generally rounded cross-sectional shape to prevent stress risers at sharp corners.

The stiffeners 416 are also capable of various orientations on the interior of the fuselage shell 412. The stiffeners 416 illustrated in FIG. 5 are in an iso-grid orientation. The iso-grid stiffeners 416 have various orientations relative to the horizontal axis 420 of the fuselage 410, where the stiffeners 416 are oriented into opposing and intersecting directions. Other stiffener 416 configurations may include an ortho-grid configuration and a hoop-grid configuration. The ortho-grid configuration may have multiple sets of stiffeners 416 oriented in substantially perpendicular relative orientations. The hoop-grid configuration may have hoop-shaped stiffeners positioned along the length of the fuselage 410.

However, any number of orientations of stiffeners 416 may be incorporated into the present fuselage 410.

Furthermore, the stiffeners 416 may be incorporated around various openings in the fuselage 410 to provide reinforcing and mounting functions. For example, as illustrated in FIG. 5, the stiffeners 416 may be positioned around the perimeter of the windows 424 and around the perimeter of the door 428 of the fuselage 410. The stiffeners 416 provide a location of increased strength and rigidity in the areas weakened by the openings for the windows 424 and the door 428.

The stiffeners 416 may also be used to create mounting locations for the door 428 or windows 424 placed in the fuselage 410. Stiffeners 416 may include thickened locations to allow for attachment of fasteners or have various mounts formed into the composite material.

The stiffeners 416 may also have various cross-sectional characteristics. For example, one type of stiffener 416 may be substantially hollow, having a composite exterior surface. Other composite stiffeners 416 may have a substantially solid and uniform composite material cross-section. In yet other stiffeners 416, the stiffeners 416 may have a core material that is different than the composite material forming the exterior of the stiffeners 416. The core material may include foam, tubing, metal, or other materials.

Figure 6:
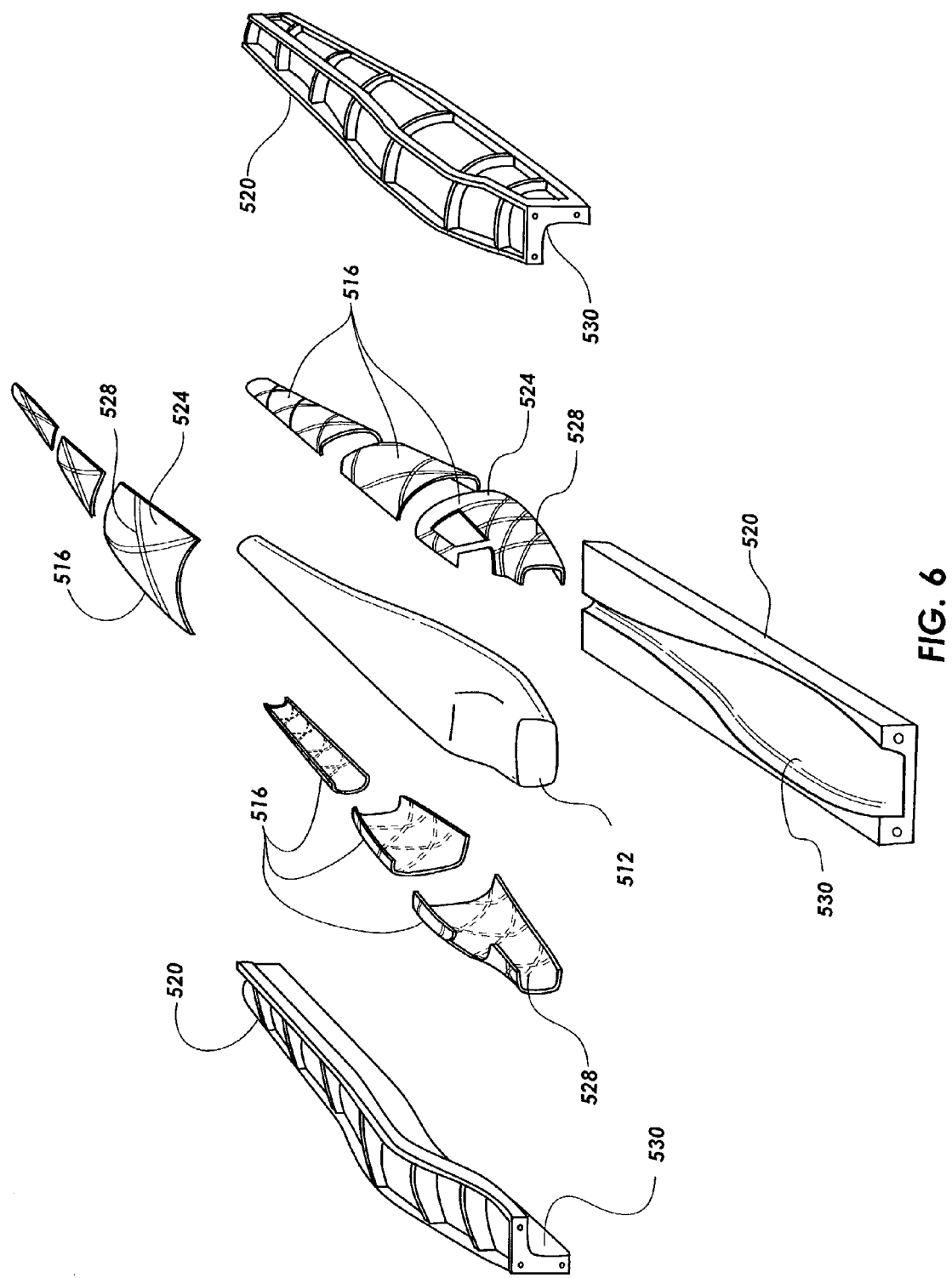
FIG. 6 is an exploded assembly view of the component employed in forming a single piece co-cured fuselage.

The fuselage shell 412 and the stiffeners 416 may be manufactured into a single piece co-cured fuselage 410 by the process described above. Referring now to FIG. 6, a process for assembling a single piece co-cured fuselage 410 is illustrated. The process may be accomplished through a form 512 surrounded by a plurality of caul sheets 516 that are covered by composite material and placed in a frame 520.

The form 512 may be similar to forms described above. The form 512 may have a foam core that shrinks while curing and is surrounded by a pressurizable membrane. The form 512 additionally may have a rigid internal frame (not shown) to provide structural support for the large form 512. The frame may also include a skewer-type support rod. The internal frame and rod would allow for transportation of the form 512 as well as the ability to rotate the form of 512 if the fuselage shell is wound on to the form 512. However, the internal frame should be sized such that the internal frame is removable from a cured fuselage.

The form 512 may be surrounded by a plurality of caul sheets 516. The caul sheets 516 may be semi rigid shell sections that surround the form 512. The caul sheets 516 are configured to form the composite material into a desired shape. The outer surface 524 of the caul sheets 516 may have various shapes and recesses in order to maintain the shape of a composite material while curing. For example, the shapes of the caul sheets 516 for the fuselage have various openings to accommodate for windows and doors in the fuselage.

The caul sheets 516 may be divided into multiple smaller sections. The caul sheets 516 may provide several functions in shaping a composite structure. One function of the multiple small sections of caul sheets 516 is the ability for the individual caul sheets 516 to independently expand outward when the form 512 pressurizes. Each smaller caul sheet 516 may independently bias outward from the form 512, allowing multiple rigid members to expand. The outward biasing caul sheets 516 shape the composite material against a shaping surface according to the contours of the individual caul sheets 516.

Another function of the smaller sections of caul sheets 516 is to allow the caul sheets 516 to be removed from the interior of the fuselage. Generally, the size of the caul sheets 516 should be smaller than the largest opening in the fuselage or other structure that is being manufactured. However, destructible caul sheets 516 may also be employed where the caul sheets 516 are generally large, but are destructibly removed after the composite material is cured.

Caul sheets 516 may also be used in other composite manufacturing processes other than a fuselage. For example, the pressurizable forms 210 illustrated in FIG. 2 may be surrounded by caul sheets (not shown). The caul sheets allows for the interior shape of a composite structure to be defined. This is a different function than the shaping surfaces 138, 140, illustrated in FIG. 1, which define the exterior shape of a composite structure. Thus, both an interior shape and exterior shape of a composite structure may be defined through the use of shaping surfaces 138, 140 and caul sheets 516.

Referring back to FIG. 6, the caul sheets 516 may be placed on the form 512 to substantially surround the form 512 to define the interior shape of the fuselage. In other configurations, only portions of the form 512 are covered by caul sheets 516. Portions of the interior of the fuselage that do not require precise shaping may not incorporate caul sheets 516.

The caul sheets 516 may be attached to the form 512 in several ways. The caul sheets 516 may be adhered to the form 512 with an adhesive. The adhesive would allow the caul sheets 516 to be built up on the form until the caul sheets 516 surround the form 512. In an alternative embodiment, the individual caul sheets 516 may be attached one to another to surround the form 512. However, the attachment should allow for flexing of the caul sheets 516 by a pressurizable form 512. In yet another embodiment, the caul sheets 516 may be surrounded by a thin layer of release material which prevents the composite material from sticking to the caul sheets 516 and also holds the caul sheets 516 together.

Once the caul sheets 516 are placed on the form 512, the composite material may be placed on the assembled caul sheets 516. In a fuselage incorporating stiffeners, the composite stiffener material may be placed on the caul sheets 516. The caul sheets illustrated in FIG. 6, are configured to receive the stiffener material through a series of channels 528 present in the caul sheets 516. The channels 528 define the shape and orientation of the stiffeners in the fuselage shell and around the windows and door.

Figure 7:
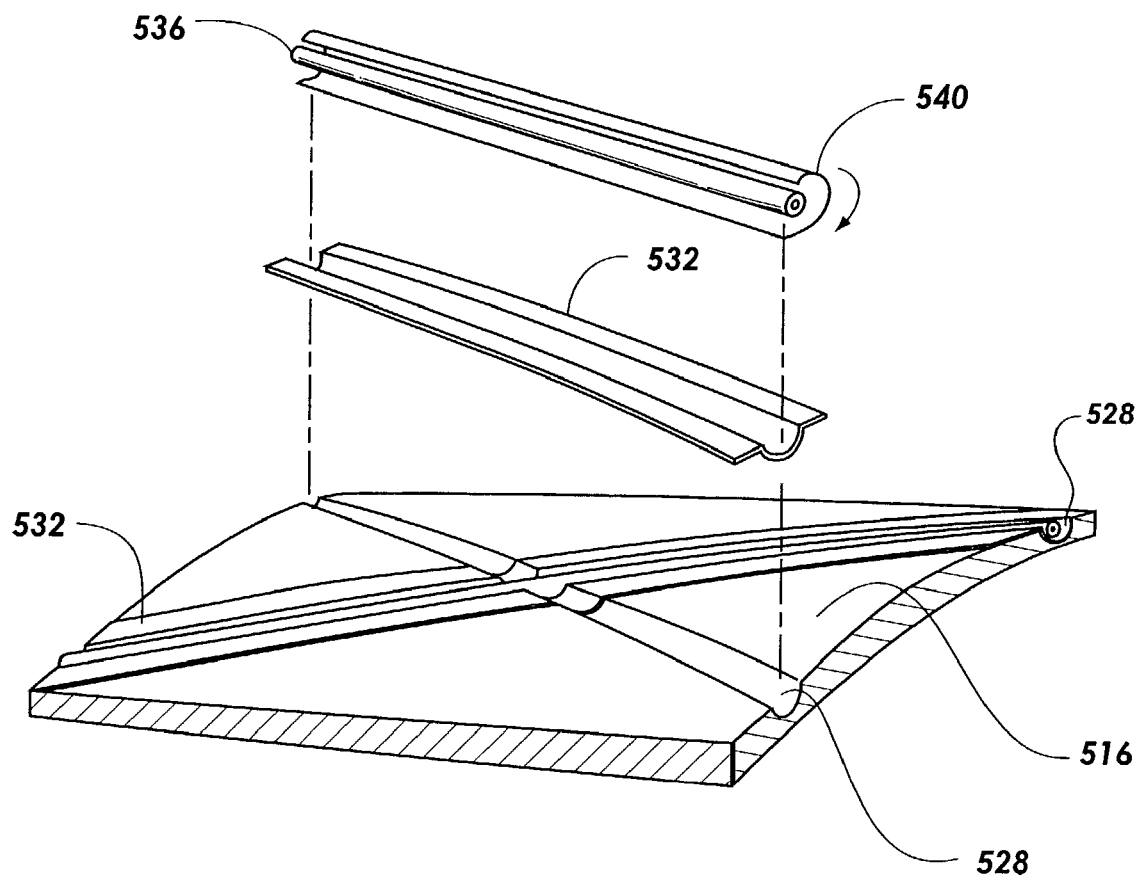
FIG. 7 is a perspective view of a stiffener assembly process.

Referring now to FIG. 7, a process for creating a stiffener on a caul sheet 516 is illustrated. The stiffener may be created by first laying a strip of composite material 532 along the stiffener channel 528. The strip of composite material 532 is configured to form the exterior of the stiffener, which is visible from the interior of the fuselage. The strip of composite material 532 may be placed in the channel 528 such that the sides of the strip of the composite material 532 extend out of the channel.

Next, a tube 536 or other desirable core material may be wrapped by a core composite material 540. The core composite material 540 may be similar to the strip of composite material 532, except that the core composite material 540 is wrapped around the tube 536 or other core material. The tube 536 provides the function of maintaining the core composite material 540 in position during curing and creates a hollow core for the stiffeners. The tube 536 may be pressurizable to maintain the shape of the stiffeners while being cured.

Once the core composite material 540 is wrapped around the tube 536, the core composite material 540 and the tube 536 are placed in the channel 528. The stiffeners may be provided in multiple short sections, or alternatively, the stiffeners may be generally long tubes 536 surrounded by a similarly sized core composite material 540 that is placed into a substantially long channel 528. The channel 528 may be a continuous opening in the assembled caul sheets 516 that wraps around the form 512, such as a helically shaped opening. Of course, other shapes of channels 528 may be use for differently shaped stiffeners, such as an ortho-grid or hoop-grid.

After the stiffeners are formed in the caul sheets 516, the fuselage shell composite material may be placed on the caul sheets 516 and the form 512. In one embodiment, the fuselage shell composite material may be wound it directly on to the caul sheets 516. The form 512 may be mounted on the filament winding machine and the fibers may be wound directly onto the caul sheets 516. Thus, the fuselage shell may be a continuous section of fiber. The filament winding machine may be configured to wind a pre-impregnated fiber on to the caul sheets 516 in order to avoid impregnating the large form with resin.

Alternatively, generally large sheets of composite material may be placed on the caul sheets 516 to form the fuselage shell. In one configuration, the sheets of composite material are laid directly on to the caul sheets 516 until the fuselage shell is formed. Composite material at the window and door locations may be omitted or removed after curing. In another configuration, sheets of composite material may be placed onto the shaping surfaces 530 of the frames 520, similar to that as illustrated in FIG. 1 and FIG. 4.

Once the fuselage shell composite material is placed on the caul sheets 516, the form 512 and the caul sheets 516 are placed into the frame 520. The frame 520 may be similar to the frame illustrated in FIG. 1 and FIG. 4, such that the frame 520 defines the exterior of the fuselage. After the frame 520 is closed, the form 512 may be pressurized to bias the stiffeners against the fuselage shell to allow the stiffeners to co-cure to the fuselage shell. Additionally, the pressurizable form 512 causes the composite material to conform to the shapes of the frame 520 and the caul sheets 516. The composite material is then cured into the define shapes. Once the composite structure is cured, the remnants of the form 512 and the caul sheets 516 may be removed from the fuselage.

While FIG. 6 illustrates only, portions of the fuselage being manufactured, the present process may be employed to manufacture additional features of the fuselage, such as the tale and the wings. Furthermore, the fuselage illustrated in FIG. 5 may be manufactured by other processes than that illustrated in FIG. 6.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A method for manufacturing a composite structure comprising:

substantially surrounding a pressurizable form with a sheet of composite material, wherein a caul sheet is disposed on the form, which includes a flexible membrane;

placing the pressurizable form, the composite material, and the caul sheet into a frame, wherein the frame has at least one shaping surface;

pressurizing the pressurizable form, such that the composite material and caul sheet are biased against the shaping surface;

curing the composite material; and removing the form and the caul sheet from the composite structure.

2. The method, as recited in claim 1, wherein the pressurizable form has a foam core.

3. The method, as recited in claim 2, wherein the foam core is structurally stable at a first temperature, and wherein the foam core shrinks at a second temperature.

4. The method, as recited in claim 2, wherein the foam core is surrounded by the flexible membrane.

5. The method, as recited in claim 1, wherein the caul sheet is destructibly removed after the composite material is cured.

6. The method, as recited in claim 1, wherein the pressurizable form is surrounded by a release layer.

7. The method, as recited in claim 1, wherein the pressurizable form is inflated to a plurality of pressures.

8. The method, as recited in claim 1, wherein the composite material is cured at a plurality of temperatures.

9. The method, as recited in claim 1, wherein the composite material is pre-impregnated with a resin.

10. The method, as recited in claim 1, wherein the pressurizable form and the at least one shaping surface of the frame have corresponding shapes.

11. The method, as recited in claim 1, wherein the frame is comprised of at least two sections.

12. The method, as recited in claim 1, wherein the composite material is first placed on the at least one shaping surface of the frame and the pressurizable form is then placed on the composite material.

13. The method, as recited in claim 1, further comprising a plurality of pressurizable forms.

14. The method, as recited in claim 13, wherein a plurality of sections of composite material are positioned between the plurality of pressurizable forms.

15. A method for manufacturing a composite structure comprising:

providing a plurality of forms having a foam core surrounded by a membrane, wherein the plurality of forms are pressurizable;

providing a frame having at least one shaping surface;

positioning sections of composite material between the plurality of forms;

placing an exterior composite material between the plurality of forms and the at least one shaping surface of the frame;

enclosing the plurality of forms and the composite material into a frame;

selectively pressurizing the plurality of pressurizable forms while the composite material is between the plurality of forms;

curing the composite material; and removing the plurality of forms from the composite structure.

16. The method, as recited in claim 15, wherein the sections of composite material and the exterior composite material are pre-impregnated with resin.

17. The method, as recited in claim 15, wherein the composite material is placed on the shaping surface.

18. The method, as recited in claim 17, wherein a vacuum layer is placed on the composite material.

19. The method, as recited in claim 18, wherein the composite material is biased against the shaping surface by evacuating air beneath the vacuum layer.

20. The method, as recited in claim 15, wherein selective sections of the composite material partially overlap selective adjacent sections of composite material.

21. The method, as recited in claim 15, wherein selective pressurizable forms have foam cores.

22. The method, as recited in claim 21, wherein the selective foam cores are structurally stable at a first temperature, and wherein the selective foam cores shrink at a second temperature.

23. The method, as recited in claim 21, wherein the pressurizable form is an inflatable bladder.

24. The method, as recited in claim 21, wherein selective foam cores are surrounded by an inflatable membrane.

25. The method, as recited in claim 15, wherein selective pressurizable forms are surrounded by a release layer.

26. The method, as recited in claim 15, wherein cauls sheets are placed on selective forms.

27. The method, as recited in claim 15, wherein the pressurizable forms are inflated to a plurality of pressures.

28. The method, as recited in claim 15, wherein the sections of composite material and the exterior composite material are cured at a plurality of temperatures.

29. The method, as recited in claim 15, wherein the at least one sheet of composite material is comprised of multiple smaller sections of composite material.

30. The method, as recited in claim 15, wherein the plurality of pressurizable forms and the at least one shaping surface of the frame have corresponding shapes.

31. The method, as recited in claim 15, wherein the frame is comprised of at least two sections.

32. The method, as recited in claim 15, wherein the composite material is first placed on the at least one shaping surface of the frame and the pressurizable form is then placed on the composite material.

33. The method, as recited in claim 15, wherein positioning sections of composite material between selective forms comprising winding composite material onto the selective forms.

34. A process for manufacturing a composite structure comprising:
providing a pressurizable fuselage form, wherein the form has a plurality of stiffener channels;
placing composite stiffener material in the stiffener channels;
wrapping a composite material around the fuselage form and the composite stiffener material;
substantially enclosing the fuselage form in a frame having at least one shaping surface;
pressurizing the pressurizable fuselage form, such that the composite material is biased against the at least one shaping surface;
curing the composite material; and
removing the form from the composite structure.

35. The process, as recited in claim 34, wherein the fuselage form is pressurized while curing.

36. The process, as recited in claim 34, wherein the form further has caul sheets positioned around the exterior of the fuselage form.

37. The process, as recited in claim 36, wherein the caul sheets are a plurality of substantially rigid sections.

38. The process, as recited in claim 36, wherein the caul sheets are a semi-flexible membrane.

39. The process, as recited in claim 36, wherein the stiffener channel in the fuselage form are located in the caul sheets.

40. The process, as recited in claim 34, wherein a release layer is wrapped around the form.

41. The process, as recited in claim 34, wherein the form is a foam core substantially surrounded by a pressurizable membrane.

42. The process, as recited in claim 41, wherein the foam core is structurally stable at a first temperature, and wherein the selective foam cores shrink at a second temperature.

43. The process, as recited in claim 34, further comprising wrapping the composite stiffener material around at least one substantially flexible tube.

44. The process, as recited in claim 39, wherein the tube is pressurizable.

45. The process, as recited in claim 34, wherein the stiffener channels are in an iso-grid pattern.

46. The process, as recited in claim 34, wherein the stiffener channels are in an ortho-grid pattern.

47. The process, as recited in claim 34, wherein the stiffener channels are in a hoop-grid pattern.

48. The process, as recited in claim 34, wherein the composite material is wound onto the form.

49. The process, as recited in claim 34, wherein the composite material is placed on the shaping surface of the frame before being wrapped around the form.

50. A process for manufacturing a composite fuselage comprising:
providing a pressurizable fuselage form, wherein the pressurizable fuselage form is surrounded by a plurality of caul sheets, and wherein the caul sheets have a plurality of stiffener channels;
placing composite stiffener material in the stiffener channels;
winding a composite material around the pressurizable fuselage form and the composite stiffener material;
substantially enclosing the fuselage form with the wound composite material thereon in a frame having at least one shaping surface;
pressurizing the pressurizable fuselage form while enclosed in the frame;
co-curing the composite material; and removing the form and caul sheets from the composite fuselage while permitting the stiffener to remain.

51. The process, as recited in claim 50, wherein the caul sheets are a plurality of substantially rigid sections.

52. The process, as recited in claim 50, wherein the caul sheets are a semi-flexible membrane.

53. The process, as recited in claim 50, wherein the form is a foam core substantially surrounded by a pressurizable membrane.

54. The process, as recited in claim 53, wherein the foam core is structurally stable at a first temperature, and wherein the selective foam cores shrinks at a second temperature.

55. The process, as recited in claim 50, further comprising wrapping the composite stiffener material around at least one substantially flexible tube.

56. The process, as recited in claim 55, wherein the tube is pressurizable.

57. The process, as recited in claim 50, wherein the stiffener channels are in an iso-grid pattern.

58. The process, as recited in claim 50, wherein the stiffener channels are in an ortho-grid pattern.

59. The process, as recited in claim 50, wherein the stiffener channels are in a hoop-grid pattern.

60. The process, as recited in claim 50, wherein the caul sheets are destructibly removed after co-curing the composite material.

61. A method for manufacturing a composite structure comprising:

substantially surrounding a pressurizable form with a sheet of composite material, wherein a caul sheet is disposed on the form, wherein the form includes a shrinkable foam core surrounded by a flexible membrane;

placing the pressurizable form and the composite material into a frame, wherein the frame has at least one shaping surface;

pressurizing the pressurizable form, such that the composite material and caul sheet are biased against the shaping surface;

curing the composite material; and removing the form and the caul sheet from the cured composite structure.

62. The method, as recited in claim 61, wherein the foam core is structurally stable at a first temperature, and wherein the foam core shrinks at a second temperature.

63. The method, as recited in claim 61, wherein the pressurizable form is an inflatable bladder the caul sheet is destructibly removed after the composite material is cured.

64. The method, as recited in claim 61, wherein the pressurizable form is surrounded by a release layer.

65. The method, as recited in claim 61, wherein the pressurizable form is inflated to a plurality of pressures.

66. The method, as recited in claim 61, wherein the composite material is cured at a plurality of temperatures.

67. The method, as recited in claim 61, wherein the composite material is pre-impregnated with a resin.

68. The method, as recited in claim 61, wherein the pressurizable form and the at least one shaping surface of the frame have corresponding shapes.

69. The method, as recited in claim 61, wherein the frame is comprised of at least two sections.

70. The method, as recited in claim 61, wherein the composite material is first placed on the at least one shaping surface of the frame and the pressurizable form is then placed on the composite material.

71. The method, as recited in claim 61, further comprising a plurality of pressurizable forms.

72. The method, as recited in claim 71, wherein a plurality of sections of composite material are positioned between the plurality of pressurizable forms.

\* \* \* \* \*